United States Patent
Tortorella

(10) Patent No.: US 12,514,226 B2
(45) Date of Patent: Jan. 6, 2026

(54) HOME PET WASHING STATION

(71) Applicant: Frank Tortorella, Shirley, NY (US)

(72) Inventor: Frank Tortorella, Shirley, NY (US)

( * ) Notice: Subject to any disclaimer, the term of this patent is extended or adjusted under 35 U.S.C. 154(b) by 0 days.

(21) Appl. No.: 18/641,853

(22) Filed: Apr. 22, 2024

(65) Prior Publication Data

US 2025/0324943 A1  Oct. 23, 2025

(51) Int. Cl.
*A01K 13/00* (2006.01)

(52) U.S. Cl.
CPC ................... *A01K 13/001* (2013.01)

(58) Field of Classification Search
CPC ..... A01K 13/00; A01K 13/001; A01K 13/003
See application file for complete search history.

(56) References Cited

U.S. PATENT DOCUMENTS

| | | | |
|---|---|---|---|
| 4,549,502 A * | 10/1985 | Namdari | A01K 13/001 119/664 |
| 5,448,966 A * | 9/1995 | McKinnon | A01K 13/001 119/676 |
| 5,724,918 A * | 3/1998 | Navalon-Chicote | A01K 13/001 119/668 |
| 6,435,136 B1 * | 8/2002 | Segura Munoz | A01K 13/001 119/665 |
| 7,011,044 B2 * | 3/2006 | Segura Jobal | A01K 13/001 119/669 |
| 7,100,538 B2 * | 9/2006 | Motomura | A01K 13/001 119/668 |
| 7,389,747 B2 * | 6/2008 | Inahara | B08B 3/026 119/677 |
| 7,497,188 B2 * | 3/2009 | Cho | A01K 13/001 119/676 |
| 9,451,758 B2 * | 9/2016 | Kaneda | A01K 13/001 |
| 11,272,688 B2 * | 3/2022 | Kim | A01K 13/001 |
| 11,582,950 B2 * | 2/2023 | Kim | A01K 15/04 |
| 2003/0196608 A1 * | 10/2003 | Lee | A01K 13/001 119/651 |
| 2023/0116485 A1 * | 4/2023 | Schade | A47L 15/4297 68/12.02 |

FOREIGN PATENT DOCUMENTS

| | | | | |
|---|---|---|---|---|
| EP | 0181048 A2 * | 5/1986 | | A01K 43/005 |
| EP | 0673599 A1 * | 9/1995 | | A01K 13/001 |
| EP | 1806051 A1 * | 7/2007 | | A01K 13/001 |
| WO | WO-2016188705 A1 * | 12/2016 | | C11D 17/041 |

* cited by examiner

*Primary Examiner* — Ebony E Evans
(74) *Attorney, Agent, or Firm* — Lyman Moulton, Esq.; Moulton Patents, PPCC

(57) ABSTRACT

The Wag N Wash is the only product of its kind that provides an essentially handsfree automatic cleaning service that rinses, shampoos and dries a pet allowing for a more enjoyable and efficient bathing experience for both the pet and the owner/groomer. This unprecedented product is uniquely designed with an in-line soap dispenser that supplies shampoo through the nozzles to effectively clean the dog within the unit, is carefully crafted with durable front doors that allow for easy access from ground level for the animal to enter and exit while the top opens for owner access to safely monitor and scrub the animal once placed inside.

15 Claims, 1 Drawing Sheet

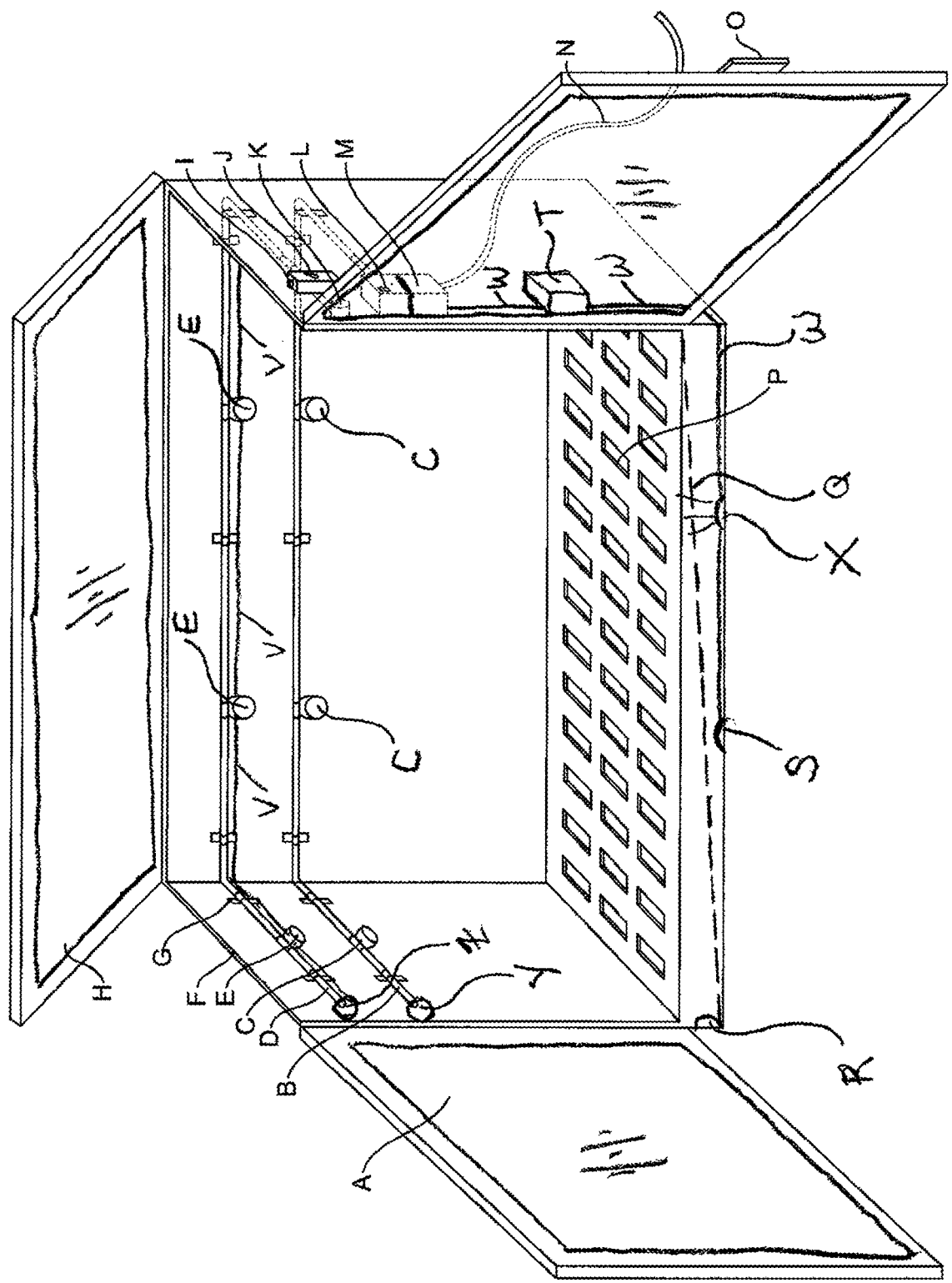

HOME PET WASHING STATION

BACKGROUND

Bathing a pet at home is almost always an unpleasant experience for both parties as it inevitably results in pet hair everywhere, a super frustrated animal owner, and an anxious pet. Additionally, grooming a pet at a professional groomer can become incredibly costly over time, unsustainable, and impractical for immediate needs. There have been no products available as original equipment or as an aftermarket to address this problem.

An apparatus that is cost effective and simplifies the process of at home bathing of a pet, is not being met by any known device or system at present. There have been no products available as original equipment or as an aftermarket to address this problem either.

SUMMARY OF THE INVENTION

The main purpose of the home pet washing station is to provide users with an at home automatic dog wash station that conveniently connects to a standard garden hose spigot and simplifies the manual labor of dog maintenance.

A washbox as disclosed includes a backwall, two side walls, a front hinged door, a top hinged lid and a bottom grate configured to drain a wash water there through onto a collecting rake and out a drain. The washbox also includes a plumbing system configured to titrate a detergent into the wash water and to distribute the wash water through the washbox from the back wall and the two side walls. The washbox further includes a ventilation system configured to distribute a hot air through the washbox from the back wall and the two side walls. The washbox yet includes an infrared light and sensor configured to measure a contaminant in the wash water and control the plumbing system and the ventilation system based on a calibrated refraction through and a calibrated reflection from the wash water.

BRIEF DESCRIPTION OF THE DRAWINGS

FIG. 1 is a front perspective view of the home pet washing station in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a front perspective view of the home pet washing station showing: hinged door referenced as A, air pipe referenced as B, air blower/dryer referenced as C water pipe referenced as D, water sprayer referenced as E, pet wash box (comes in different sizes) referenced as F, brackets referenced as G, hinged lid referenced as H, refillable shampoo dispenser referenced as I, valve to dispense shampoo referenced as J, quick connect for water hose referenced as K, dryer power button referenced as L, dryer/air blower machine referenced as M, retractable power cord folds into bottom compartment of dryer machine referenced as N, door latch referenced as O, P wash floor grate, Q collecting rake, drain R, sensors S, control box T, hot water coil V and control wires W and UV light source X in accordance with an embodiment of the present disclosure. The sensors S, detect an amount of contaminant in the wash water filtering through the wash floor grate P, down across the collecting rake Q and into the drain R through an infrared light refraction and reflection. Based on a calibration of the infrared light refraction and reflection, the sensors communicate with the control box T through wires W to turn on and off the wash water and the air blower dryer. The hinged doors A and hinged lid H comprise a glass or a translucent material to help the animal or pet relax and to enable more visible light to enter the pet bath. Additionally, a quick connect hose connection Y to the ventilation system allows for auxiliary not air access. A quick connect hose connection Z to the plumbing system allows for auxiliary hot water to spray a pet in the pet wash station at home.

The present disclosed home pet washing station, also known as "Wag N Wash", offers a modern system that ensures individuals are able to bathe their pets in the convenience of their own homes, stress and mess-free, keeping both their dwelling and their pets nice and clean, post service. Expanding on the initial design of an average dog washing system, the Wag N Wash introduces a novel designated doggie wash station that features multiple water jets that will rinse the pet as well as dispense the sudsy soap through the unit and onto the animal via an in-line soap dispenser option. The domestic system conveniently hooks up to a standard garden hose spigot to supply water to the internal shower heats and sprinkler nozzles. To enhance functionality, this avant-garde product includes a blower that dispenses environment temperature air for superior even coat drying, post wash. Furthermore, the Wag N Wash also doubles as a storage location for all dog related toys and grooming products offering a centralized organizational unit to pet owners. This innovative, top-quality product ensures a fully operational at home designated dog washing station that is ground level for added comfort for both the pet and the owner.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A washbox comprising:
   a backwall, two side walls, a front hinged door, a top hinged lid and a bottom grate configured to drain a wash water there through onto a collecting rake and out a drain;
   a plumbing system configured to titrate a detergent into the wash water and to distribute the wash water through the washbox from the back wall and the two side walls;

a ventilation system configured to distribute a hot air through the washbox from the back wall and the two side walls;

an infrared light and sensor configured to measure a contaminant in the wash water and control the plumbing system and the ventilation system based on a calibrated refraction through the wash water and a calibrated reflection from the wash water.

2. The washbox of claim 1, wherein the backwall and the two side walls are opaque to visible light.

3. The washbox of claim 1, wherein the front hinged door and the top hinged lid are transparent to visible light.

4. The washbox of claim 1, wherein the collecting rake is a sloped sub surface configured to slope up from the drain towards the bottom grate.

5. The washbox of claim 1, wherein the plumbing system is situated closer to the top hinged lid relative to the ventilation system.

6. The washbox of claim 1, further comprising a shampoo dispenser configured to titrate the shampoo into the plumbing system.

7. The washbox of claim 1, further comprising a water hose quick connect source to the plumbing system.

8. The washbox of claim 1, further comprising a hot air blower machine in communication with the ventilation system.

9. The washbox of claim 1, wherein the front hinged door comprises a pair of french doors each hinged on a side adjacent a side wall and meeting in a middle of the washbox.

10. The washbox of claim 1, further comprising a control box in communication with the infrared light and the sensor and comprising electronics to control the plumbing system and the ventilation system based on the contaminate in the wash water.

11. The washbox of claim 1, wherein the plumbing system comprises multiple water jets lineally distributed on the back wall and on the two side walls.

12. The washbox of claim 1, wherein the ventilation system comprises multiple hot air blower jets lineally distributed on the back wall and on the two side walls.

13. The washbox of claim 1, further comprising a timer in the control box to shut off the plumbing system and the ventilation system based on a predetermined amount of time.

14. The washbox of claim 1, wherein the drain is sized to pass three times more wash water fluid than a water inlet is sized to pass a supply water into the washbox to enable squirting a pet in the washbox with an additional water source.

15. The washbox of claim 1, further comprising a quick connect hose access to a heated water from the plumbing system for hooking an auxiliary hose thereto for squirting a pet inside the washbox.

* * * * *